United States Patent
Min (10) Patent No.: US 11,697,388 B2
(45) Date of Patent: Jul. 11, 2023

(54) ROOF AIRBAG FOR VEHICLE

(71) Applicant: HYUNDAI MOBIS CO., LTD., Seoul (KR)

(72) Inventor: Byung Ho Min, Yongin-si (KR)

(73) Assignee: HYUNDAI MOBIS CO.. LTD., Seoul (KR)

( * ) Notice: Subject to any disclaimer, the term of this patent is extended or adjusted under 35 U.S.C. 154(b) by 0 days.

(21) Appl. No.: 17/864,677

(22) Filed: Jul. 14, 2022

(65) Prior Publication Data

US 2023/0064029 A1 Mar. 2, 2023

(30) Foreign Application Priority Data

Aug. 26, 2021 (KR) .......................... 10-2021-0113379

(51) Int. Cl.
| | |
|---|---|
| *B60R 21/214* | (2011.01) |
| *B60R 21/26* | (2011.01) |
| *B60R 21/231* | (2011.01) |
| *B60R 21/2338* | (2011.01) |

(52) U.S. Cl.
CPC ............ *B60R 21/214* (2013.01); *B60R 21/26* (2013.01); *B60R 2021/23161* (2013.01); *B60R 2021/23192* (2013.01); *B60R 2021/23386* (2013.01)

(58) Field of Classification Search
CPC .................. B60R 21/214; B60R 21/26; B60R 2021/23161; B60R 2021/23192; B60R 2021/23386
See application file for complete search history.

(56) References Cited

U.S. PATENT DOCUMENTS

| | | | |
|---|---|---|---|
| 9,573,550 B1* | 2/2017 | Mitchell | B60R 21/213 |
| 2005/0046154 A1* | 3/2005 | Rhea | B60R 21/213 |
| | | | 280/730.2 |
| 2019/0193666 A1* | 6/2019 | Jost | B60R 21/231 |
| 2019/0217804 A1* | 7/2019 | Cho | B60R 21/233 |
| 2019/0241148 A1* | 8/2019 | Shin | B60R 21/232 |
| 2020/0307496 A1* | 10/2020 | Jimenez | B60R 21/2338 |
| 2020/0384939 A1* | 12/2020 | Rutgersson | B60R 21/015 |
| 2020/0391689 A1* | 12/2020 | Fischer | B60R 21/233 |
| 2021/0197748 A1* | 7/2021 | Jeong | B60R 21/2338 |
| 2022/0017036 A1* | 1/2022 | Jeong | B60R 21/214 |
| 2022/0144203 A1* | 5/2022 | Sung | B60R 21/214 |

FOREIGN PATENT DOCUMENTS

| | | | | |
|---|---|---|---|---|
| DE | 202021101051 U1 * | 4/2021 | ........... | B60R 21/214 |
| DE | 202022104637 U1 * | 10/2022 | | |
| KR | 20050037174 A * | 4/2005 | | |

* cited by examiner

*Primary Examiner* — Drew J Brown
(74) *Attorney, Agent, or Firm* — NovoTechIP International PLLC

(57) ABSTRACT

Proposed is a roof airbag that is disposed at the roof of a vehicle and is deployed into an interior space of the vehicle. A bracket is provided to the roof. An inflator is connected to the bracket and configured to discharge an inflation gas when operated. An airbag cushion is provided to an airbag cover connected to the bracket in a foldable way and deployed into an interior space of the vehicle by the inflation gas supplied by the inflator. A tether is configured such that one end thereof is fixed to the roof side, and the other end of which is connected to the airbag cushion. The tether supports the airbag cushion so that, when the airbag cushion is deployed, the airbag cushion is deployed toward a seat.

11 Claims, 5 Drawing Sheets

ROOF AIRBAG FOR VEHICLE

CROSS-REFERENCE TO RELATED APPLICATIONS

The present application claims the benefit of priority of Korean Patent Application No. 10-2021-0113379 filed on Aug. 26, 2021, the entire content of which is incorporated here for all purposes by reference.

BACKGROUND

1. Technical Field

The present disclosure relates to a roof airbag for a vehicle, which may be deployed toward a vehicle occupant, and enable a position thereof to be maintained in a deployed state.

2. Discussion of Related Art

Airbags are essentially used for the safety of passengers travelling in a vehicle. Such a vehicle is commonly equipped with airbags that may be deployed to protect a driver and other vehicle occupants in various positions such as to the front or sides thereof.

The airbags for a vehicle are activated in such a manner that an airbag cushion is deployed by an inflator that explodes an inflation gas when receiving an impact sensing signal from an impact sensor. The deployed airbag cushion absorbs an impact of the vehicle occupant travelling in the vehicle, and can thereby protect the vehicle occupant from bodily injuries. To effectively reduce injuries of the vehicle occupant, research and development for airbags are in progress.

Meanwhile, attention to autonomous vehicles has recently been increased. Autonomous vehicles are vehicles in which autonomous driving technology, by which a user or a vehicle occupant can request that a vehicle travels by itself without the user's direct input, in which a moving direction, a moving speed, and so on are selected by the vehicle. Because a driver does not participate in operation of the autonomous vehicle, the necessity for the driver's seat to always be fixed toward the front is low. Therefore, the position and the arrangement structure of the vehicle occupant seats can be made to be various, and thus a necessity to protect the vehicle occupants using the airbag in all possible seating configurations is important.

In particular, a roof airbag for protecting the vehicle occupants from a vehicle overturn accident are mounted on the roof of the vehicle. The roof airbag is deployed from the roof of the vehicle when an overturn accident occurs, thereby absorbing the impact of the vehicle occupant, so that it is possible to prevent a phenomenon in which the vehicle occupant is thrown out of the vehicle body.

A conventional roof airbag operates to cover the roof of the vehicle to protect the vehicle occupant. However, because the conventional roof airbag is simply deployed to cover the roof of the vehicle, there is a limit to protection of the vehicle occupant. Further, when such a conventional roof airbag is deployed into an internal space of the vehicle, external force is applied to the vehicle occupant from one side of the roof airbag, so that the roof airbag is pushed in the opposite direction. Thus, there may be a problem in which the vehicle occupant located on the other side is wounded.

The above information disclosed in this Background section is only for an enhancement of understanding of the background of the invention, and therefore it should not be taken that the above information belongs to the prior art that is already known in this country to a person of ordinary skill in the art.

SUMMARY

The present disclosure has been proposed to solve the above problem, and an object of the present disclosure is to provide a roof airbag for a vehicle, deployed from a roof of the vehicle when a vehicular accident occurs, and which is deployed toward a vehicle occupant, so that it is possible to effectively protect the vehicle occupant.

Further, another object of the present disclosure is to provide a roof airbag for a vehicle, in which a position is maintained with the roof airbag deployed, and in which a manner in which an airbag cushion is deployed can be adjusted.

Objects to be solved by the present disclosure are not limited to the aforementioned objects, and the other objects not described above may be evidently understood from the following description by those skilled in the art.

A roof airbag for a vehicle, to achieve the objects, according to an embodiment of the present disclosure, is a roof airbag that is disposed in a roof of the vehicle, and may include: a bracket provided to the roof; an inflator connected to the bracket and configured to discharge an inflation gas when operated; an airbag cushion provided to an airbag cover connected to the bracket in a foldable way and deployed into an interior space of the vehicle by the inflation gas supplied by the inflator; and a tether, one end of which is fixed to the roof side, and the other end of which is connected to the airbag cushion, and configured to support the airbag cushion so that, when the airbag cushion is deployed, the airbag cushion is deployed toward a seat.

Here, the airbag cushion may include a first chamber deployed toward one side in a vehicle width direction when deployed, and a second chamber deployed toward the other side in the vehicle width direction.

Effects to be obtained from the present disclosure are not limited to the aforementioned effects, and other effects, not described above may be evidently understood from the following description by those skilled in the art.

DETAILED DESCRIPTION

Hereinafter, the present disclosure will be described in detail by describing disclosed embodiments of the present specification with reference to the accompanying drawings. However, regardless of the reference character, the same or similar constituent elements shall be given the same reference number and the redundant descriptions shall be omitted. The suffixes "module" and "unit" for the constituent elements used in the descriptions below are given or mixed with the ease of the specification describing, and do not have any distinctive meaning or role in itself each other. In addition, in describing the embodiments of the present specification, if a specific description of the related prior art is deemed to obscure the essential points of the embodiments of the present specification, the detailed description will be omitted. In addition, the accompanying drawings are intended to facilitate the understanding of the embodiments set forth in the present specification, not to limit the technical idea of the present specification by the accompanying drawings. All alterations, equivalents, and substitutes that are included within the technical idea of the present disclosure should be understood as falling within the scope of the present disclosure.

The ordinal number terms first, second, and so on may be used to describe various constituent elements, but such constituent elements should not be restricted by these terms. These terms are only used to distinguish one constituent element from another. For example, without deviating from the scope of rights according to the concept of the present disclosure, the first constituent element may be named as the second constituent element. Similarly, the second constituent element may be named as the first constituent element.

It should be understood that a constituent element, when referred to as being "connected to" or "coupled to" a different constituent element, may be directly connected to or directly coupled to the different constituent element or may be coupled to or connected to the different constituent element with a third constituent element therebetween. In contrast, it should be understood that a constituent element, when referred to as being "directly coupled to" or "directly connected to" a different constituent element, is coupled to or connected to the different constituent element without a third constituent element therebetween. Other expressions describing the relationship between the constituent elements, "between" and "directly between" or "adjacent to" and "directly adjacent to" should be similarly interpreted.

The term used in the present specification is merely used to describe a specific embodiment, and is not intended to limit the present invention. A noun in singular form has the same meaning as when used in plural form unless it has a different meaning in context. It should be understood that, throughout the present specification, the terms "include," "have," or the like are intended to indicate that a feature, a number, a step, an operation, a constituent element, a component, or a combination thereof is present, without precluding the possibility that one or more other features, numbers, steps, operations, constituent elements, components, or a combination thereof will be present or added.

Unless otherwise defined, all terms used herein, including technical or scientific terms, have the same meanings as those generally understood by those of ordinary skill in the art to which the invention pertains. Such terms as those defined in a generally used dictionary are to be interpreted as having meanings equal to the contextual meanings in the relevant field of art, and are not to be interpreted as having ideal or excessively formal meanings, unless clearly defined in the present application.

Hereinafter, exemplary embodiments of the present disclosure will be described with reference to the attached drawings. The same reference numeral suggested in each drawing indicates the same member.

Figure 1:
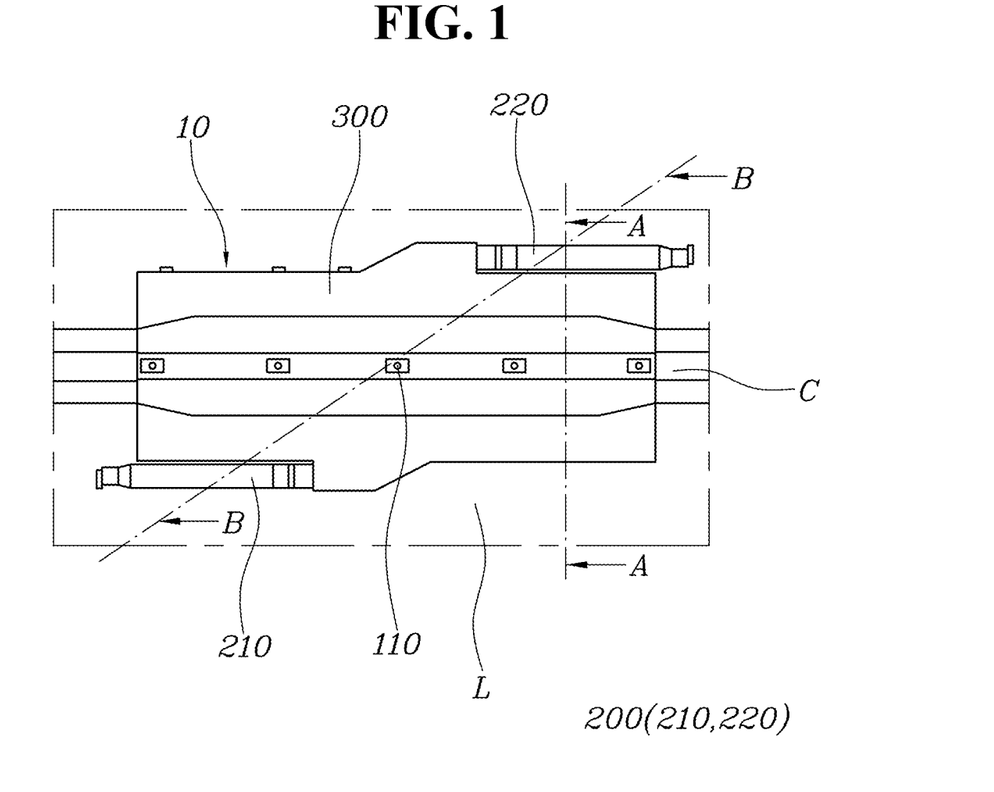
FIG. 1 is a view illustrating a state in which a roof airbag for a vehicle according to an embodiment is mounted on a roof of the vehicle.
Figure 2:
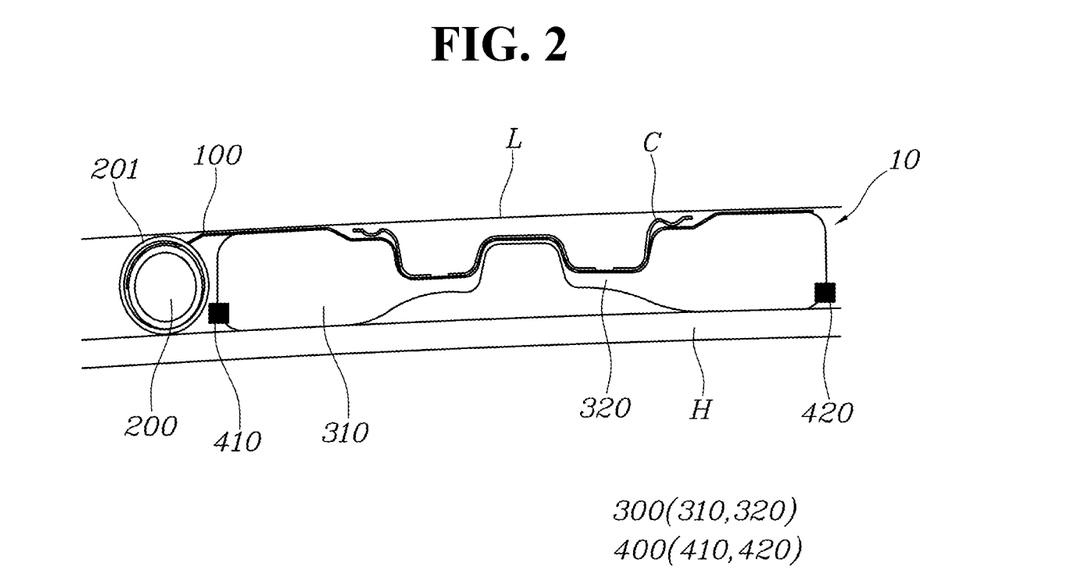
FIG. 2 is a cross-sectional view taken along line A-A of FIG. 1.
Figure 3:
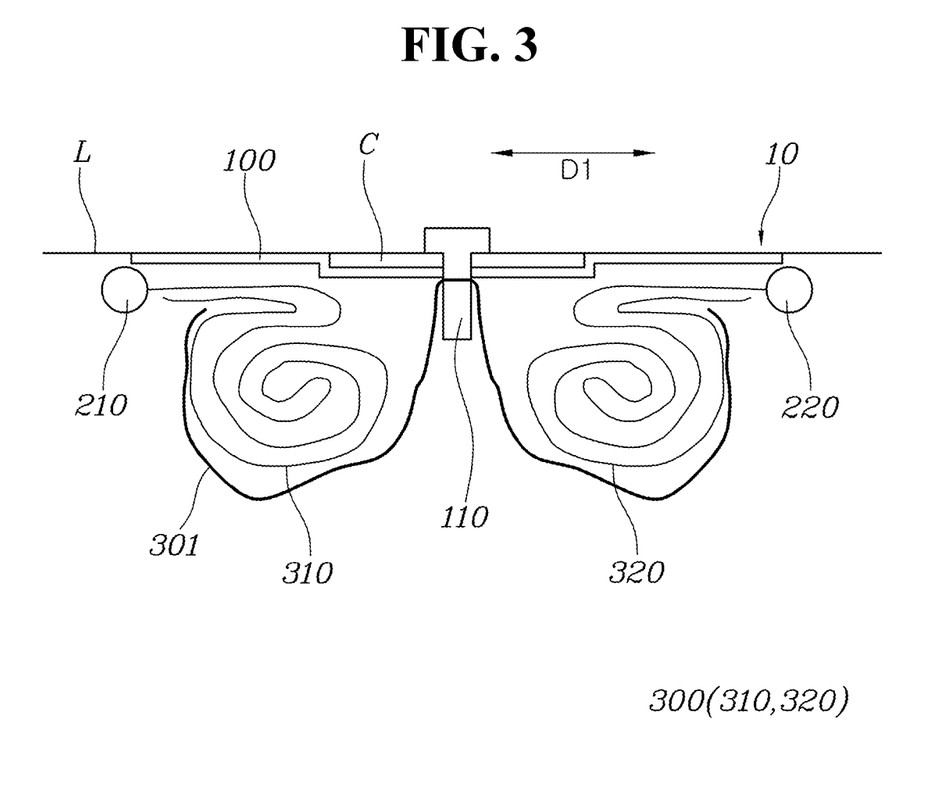
FIG. 3 is a cross-sectional view taken along line B-B of FIG. 1.

FIG. 1 is a view illustrating a state in which a roof airbag for a vehicle according to an embodiment is mounted on a roof of the vehicle. FIG. 2 is a cross-sectional view taken along line A-A of FIG. 1. FIG. 3 is a cross-sectional view taken along line B-B of FIG. 1.

Referring to FIGS. 1 to 3, a roof airbag 10 for a vehicle according to an embodiment may include a bracket 100 disposed at or provided to a roof L, an inflator 200 configured to discharge an inflation gas, an airbag cushion 300 supplied with the inflation gas and deployed into an interior space of the vehicle, and a tether 400 configured to support the airbag cushion 300 when the airbag cushion 300 is deployed.

The bracket 100 may be mounted on the roof L of the vehicle. The bracket 100 may fix the roof airbag 10 for the vehicle according to the present embodiment to the roof L of the vehicle. At least a part of the bracket 100 may be connected to the airbag cover 301 to be described below. The bracket 100 may be formed of a material capable of withstanding impact energy generated when the airbag cushion 300 is deployed.

The bracket 100 may be mounted on the roof L of the vehicle by fastening members 110. At least some of the fastening members 110 extends or pass through the bracket 100, and may be inserted into the roof L for the vehicle, thereby fixing the roof airbag 10 to the roof L of the vehicle. For example, the fastening members 110 may be bolts extending or passing through the bracket 100 and inserted into the roof L of the vehicle. The fastening members 110 may be provided in plural.

The bracket 100 may be mounted on a cross panel C. The bracket 100 is mounted on the cross panel C, and thereby the roof airbag 10 can be stably mounted on the side of the roof L. The bracket 100 is mounted on the cross panel C, and the airbag cushion 300 is folded at a lower portion of the bracket 100, so that the built-in airbag cover 301 can be disposed.

Referring to FIG. 2, a head liner H may be disposed at a lower portion of the roof airbag 10 for the vehicle. When the roof airbag 10 for the vehicle related to an embodiment is mounted on the vehicle, the airbag cover 301 and the bracket 100 are mounted on the cross panel C by the fastening member 110, and then a head liner H can be mounted. The fastening members 110 extend or pass through the airbag cover 301 and the bracket 100, and can be mounted on the panel for the roof L.

Therefore, the airbag cushion 300 may be disposed between the bracket 100 and the head liner H.

The inflator 200 may be connected to the bracket 100, and a position thereof can be fixed. The bracket 100 has a shape at a point at which the inflator 200 is connected corresponding to a shape of the inflator 200. For example, in the case in which the inflator 200 has a cylindrical shape, at least a part of the bracket 100 which is connected to the inflator 200 may have a cylindrical shape.

The inflator 200 and the bracket 100 may be fastened by a clamp band 201 including a flange. The clamp band 201 can stably connect the bracket 100 and the inflator 200. Further, the clamp band 201 can seal a connection point between the bracket 100 and the inflator 200 so as to prevent gas discharged from the inflator 200 from flowing to the outside.

The inflator 200 can discharge the expanded gas when operated. The inflator 200 can communicate with the inside of the airbag cushion 300.

The inflator 200 can emit the inflation gas toward the airbag cushion 300 housed inside the bracket 100. Although not illustrated in the figure, the inflator 200 may include an igniter, a gas generator in which an explosive and an inflation gas are stored, and a diffuser guiding a flow of the inflation gas. When an impact sensor senses a collision of the vehicle, the impact sensor transmits a sensed collision signal to an electronic control unit (ECU). The ECU can operate the inflator 200 on the basis of the sensed collision signal.

The inflator 200 may include a first inflator 210 and a second inflator 220. The first inflator 210 and the second inflator 220 may be disposed to face each other. As illustrated in FIG. 1, the first inflator 210 and the second inflator 220 may be disposed to face each other with respect to the direction in which the cross panel C extends.

Referring to FIG. 3, the airbag cushion 300 can be housed inside the airbag cover 301. The airbag cushion 300 can be housed inside the airbag cover 301 in a folded state. When supplied with the inflation gas from the inflator 200, the airbag cushion 300 is inflated, and can thereby cut out a cutout section of the airbag cover 301 and can be deployed into the interior space of the vehicle.

The tether 400 can support the airbag cushion 300 such that the airbag cushion 300 is deployed toward the seats when displayed. In the roof airbag 10 related to the present embodiment, the tether 400 positions a direction when the airbag cushion 300 is deployed, and can maintain a position of the airbag cushion 300 in a state in which the airbag cushion 300 is deployed. When the airbag cushion 300 is deployed into the interior space of the vehicle, the roof airbag 10 for the vehicle related to the present embodiment is not simply deployed downwardly from the roof L toward the interior space of the vehicle, but can be deployed toward the seat by the tether 400.

One end of the tether 400 is fixed to the side of the roof L, and the other end of the tether 400 can be connected to an end of the airbag cushion 300. The inflation gas is supplied to the airbag cushion 300 by the inflator 200, and thereby the other end of the tether 400 can move together with the airbag cushion 300 when the airbag cushion 300 is deployed. Therefore, as the tether 400 become inflated, tension is formed at the tether 400, and thus the airbag cushion 300 can be supported by the tension of the tether 400. Matters regarding the tether 400 will be described below with reference to FIG. 4.

Referring to FIG. 3, the airbag cushion 300 may include a first chamber 310 and a second chamber 320. The first chamber 310 and the second chamber 320 can be distinguished according to the deployed position. When the airbag cushion 300 is deployed, the first chamber 310 can be deployed to one side in the width direction D1 of the vehicle, and the second chamber 320 can be deployed to the other side in the width direction D1 of the vehicle. That is, the directions in which the first chamber 310 and the second chamber 320 are deployed may be directions opposite to the width direction D1 of the vehicle.

The fastening members 110 extend or pass through the bracket 100 and the airbag cover 301 and are mounted on the roof L, thereby fixing the bracket 100 and the airbag cover 301 to the roof L. The first chamber 310 and the second chamber 320 can be folded and provided on the opposite sides of the bracket 100 centering on the fastening member 110. The space of the airbag cover 301 is partitioned into opposite sides by the fastening member 110, and the first chamber 310 and the second chamber 320 can be housed in the portioned spaces.

Further, the first inflator 210 can be connected to the first chamber 310, and the second inflator 220 can be connected to the second chamber 320. The first inflator 210 can supply the inflation gas to the first chamber 310, and the second inflator 220 can supply the inflation gas to the second chamber 320. In other words, the first chamber 310 can be deployed when the first inflator 210 is operated, and the second chamber 320 can be deployed when the second inflator 220 is operated.

The first inflator 210 and the second inflator 220 can be operated independently of each other. For example, the second inflator 220 cannot be operated when the first inflator 210 is operated, and the first inflator 210 cannot be operated when the second inflator 220 is operated. According to a position at which collision occurs, a collision direction, or whether a vehicle occupant takes a seat, the first inflator 210 and the second inflator 220 are operated to be independent of each other. Thereby, it is possible to effectively protect the vehicle occupant so as to be suitable for situations, and to prevent components from be replaced due to unnecessary operation of the roof airbag 10 for the vehicle.

Figure 4:
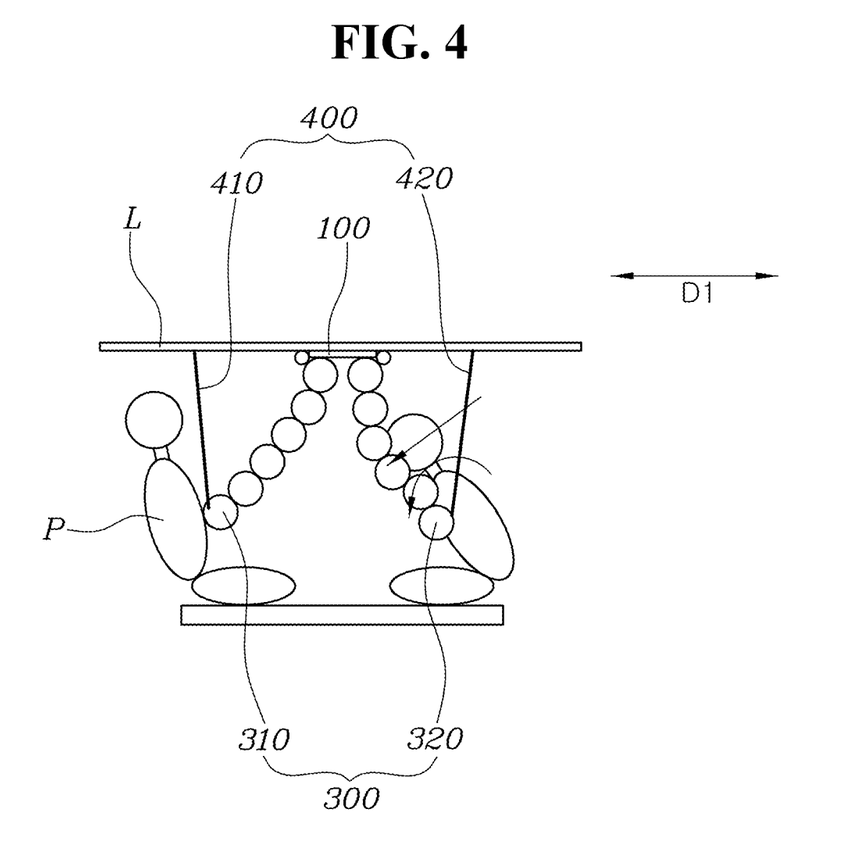
FIG. 4 is a view schematically illustrating a state in which the roof airbag for a vehicle according to an embodiment is deployed.

FIG. 4 is a view schematically illustrating a state in which the roof airbag for a vehicle according to an embodiment is deployed. A structure in which the roof airbag 10 for a vehicle according to an embodiment is deployed will be described in detail with reference to FIG. 4.

Referring to FIG. 4, the bracket 100 of the roof airbag 10 for a vehicle according to an embodiment can be disposed between the seats. For example, the bracket 100 may be disposed on the roof L in the center of the vehicle in the width direction D1. In the case of a general vehicle, seats are disposed on opposite sides between which the center of the vehicle in the width direction D1 is located, and thus the bracket 100 can be disposed between the seats when disposed on the roof L at the center of the vehicle in the width direction D1. Therefore, the bracket 100 can be disposed between vehicle occupants who take a seat.

When the inflator 200 receives a collision signal from the impact sensor and is operated, the inflation gas can be supplied to the airbag cushion 300. When the inflation gas is supplied to the interior of the airbag cushion 300, the airbag cushion 300 can be deployed to the interior space of the vehicle while being inflated. In this case, the tether 400 can guide the airbag cushion 300 such that the airbag cushion 300 is deployed toward the seats disposed on both sides of the bracket 100.

The first chamber 310 can be deployed toward one side by the tether 400, and the second chamber 320 can be deployed toward the other side. Therefore, the first chamber 310 can protect a vehicle occupant P who takes a seat on one side, and the second chamber 320 can protect a vehicle occupant P who takes a seat on the other side.

Referring to FIG. 4, the tether 400 can include a first tether 410 connected to the first chamber 310, and a second tether 420 connected to the second chamber 320. In a state in which the airbag cushion 300 is deployed, one end of the first tether 410 may be connected to be separated from the roof L to one side with respect to the width direction D1 of the vehicle, and the other end of the first tether 410 may be connected to the other end of the first chamber 310.

Likewise, one end of the second tether 420 may be connected apart to the other side with respect to the vehicle in the width direction D1 of the roof L, and the other end of the second tether 420 may be connected to an end of the second chamber 320.

Since one end of the first tether 410 is connected apart to one side with respect to the vehicle in the width direction D1, the other end of the first tether 410 can restrict a deployment direction when the first chamber 310 is deployed to one side. The first chamber 310 can be deployed toward one side with respect to the vehicle in the width direction D1 by tensile force of the first tether 410.

Further, since one end of the second tether 420 is connected to be separated from the other side with respect to the vehicle in the width direction D1, the other end of the second tether 420 can restrict a deployment direction when the second chamber 320 is deployed to the other side. Therefore, the second chamber 320 can be deployed toward the other side with respect to the vehicle in the width direction D1 by tensile force of the second tether 420.

In other words, the first tether 410 can guide the first chamber 310 so as to be deployed to one side with respect to the vehicle in the width direction D1, and the second tether 420 can guide the second chamber 320 so as to be deployed to one side with respect to the vehicle in the width direction D1.

Making a description in detail with reference to FIG. 4, one end of the first tether 410 can be fixed apart from the center of the vehicle in the width direction D1 of the roof L by a fixed distance in a direction in which the first chamber 310 is located, and the other end of the first tether 410 can be connected to an end of the first chamber 310. When an inflation gas is supplied to the airbag cushion 300, the first chamber 310 is deployed. Since one end of the first tether 410 is fixed to be separated toward the side at which the first chamber 310 is located from the center of the vehicle in the width direction D1, the first chamber 310 can be naturally deployed toward one side of the vehicle in the width direction D1 by the first tether 410. Tensile force can be formed at the first tether 410 along with the expansion and the deployment of the first chamber 310, and a state in which the first chamber 310 is deployed to one side of the vehicle in the width direction D1 can be maintained by the tensile force of the first tether 410.

Likewise, one end of the second tether 420 can be fixed apart from the center of the vehicle in the width direction D1 by a fixed distance in a direction in which the second chamber 320 is located, and the other end of the second tether 420 can be connected to an end of the second chamber 320. When an inflation gas is supplied to the airbag cushion 300, the second chamber 320 is deployed. Since one end of the second tether 420 is fixed to be separated toward the side at which the second chamber 320 is located from the center of the vehicle in the width direction D1, the second chamber 320 can be naturally deployed toward the other side of the vehicle in the width direction D1 by the second tether 420. Tensile force can be formed at the second tether 420 along with the expansion and the deployment of the second chamber 320, and a state in which the second chamber 320 is deployed to one side of the vehicle in the width direction D1 can be maintained by the tensile force of the second tether 420.

The first chamber 310 is deployed to one side of the vehicle in the width direction D1, thereby the vehicle occupant P seated in a seat located on one side of the vehicle can be protected. The second chamber 320 is deployed to the other side of the vehicle in the width direction D1, thereby the vehicle occupant P seated in a seat located on the other side of the vehicle can be protected. When a vehicular accident of the vehicle occurs, the roof airbag 10 according to the present disclosure is deployed toward the seated vehicle occupant P, and thereby the vehicle occupant P can be effectively protected from the vehicular accident.

When the first chamber 310 and the second chamber 320 are respectively deployed toward the vehicle occupant P, they can absorb impact by a contact with a chest portion of the vehicle occupant P. The first tether 410 and the second tether 420 can effectively restrain a behavior of the vehicle occupant as tensile force is configured to be able to maintain positions at which the first chamber 310 and the second chamber 320 are deployed. Therefore, it is possible to prevent the vehicle occupants P who take a seat in proximity of each other from having an effect on each other when the collision accident occurs.

Figure 5:
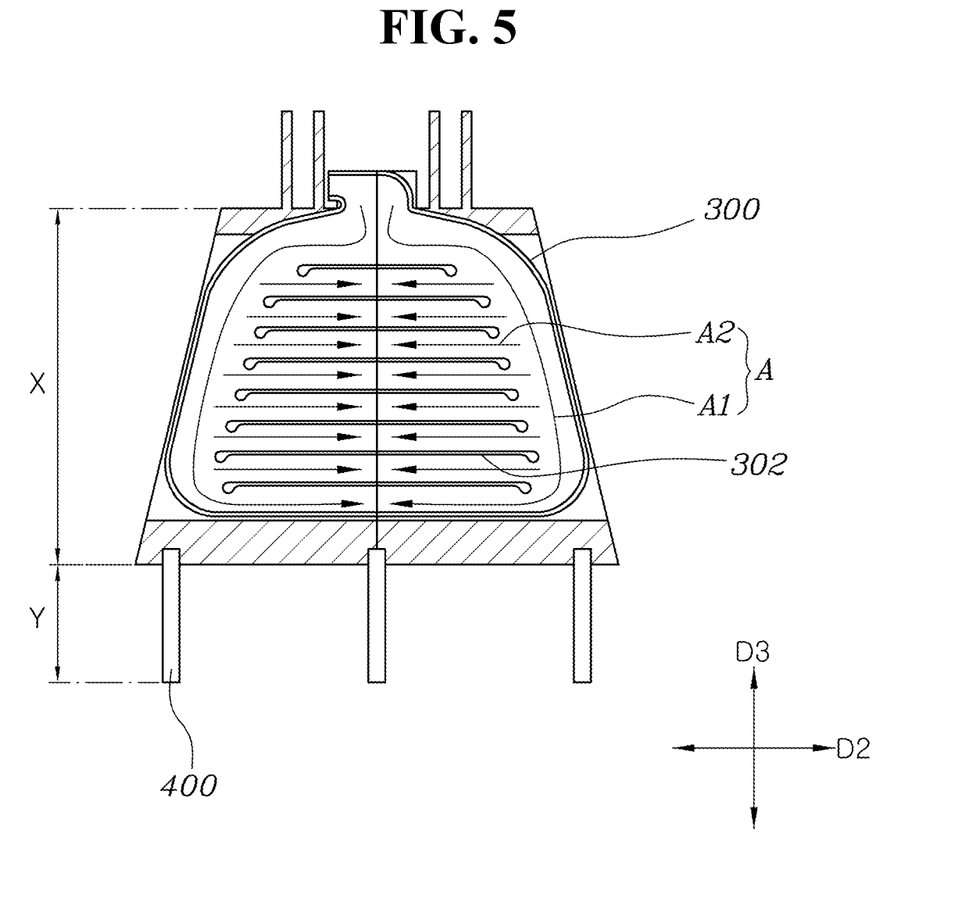
FIG. 5 is a view illustrating a cushion of the roof airbag for a vehicle according to an embodiment.

FIG. 5 is a view illustrating a cushion of the roof airbag 10 for a vehicle according to an embodiment.

Referring to FIG. 5, in a state in which the airbag cushion 300 is deployed, a length Y of the tether 400 may be smaller than or equal to a length X of the airbag cushion 300. That is, a length Y from one end to the other end of the tether 400 may be smaller than or equal to a length X of the airbag cushion 300 with respect to the direction in which the airbag cushion 300 is deployed.

When the airbag cushion 300 is deployed, the seated vehicle occupant moves toward the airbag cushion 300, and thereby can come into contact with the airbag cushion 300. Since the airbag cushion 300 absorbs impact when the vehicle occupant comes into contact with the airbag cushion 300, there can occur a phenomenon in which the vehicle occupant is pushed in an application direction of external force when the position of the airbag cushion 300 is not fixed by a strong force. When the airbag cushion 300 is pushed, the vehicle occupant cannot be effectively protected, as well as the vehicle occupant seated on the opposite side can be injured by the pushed airbag cushion 300.

Since the roof airbag 10 for a vehicle related to one embodiment can effectively adjust a direction in which the airbag cushion 300 is deployed when deployed because the length Y of the tether 400 is smaller than or equal to the length X of the airbag cushion 300 in a state in which the airbag cushion 300 is deployed. If the length Y of the tether 400 is too long, the airbag cushion 300 cannot be restricted from being deployed in an unintended direction when the airbag cushion 300 is deployed.

Further, since the length Y of the tether 400 is smaller than or equal to the length X of the airbag cushion 300, the tether 400 becomes tight in a state in which the airbag cushion 300 is deployed, so that the airbag cushion 300 can be stably supported. If the length Y of the tether 400 is too long when the airbag cushion 300 is strained and deployed, the tensile force for supporting the airbag cushion 300 is reduced, and thus the airbag cushion 300 can be pushed by a behavior of the vehicle occupant P. The tether 400 can have a tension sufficient for a position to be maintained even when an external force is applied in a state in which the airbag cushion 300 is deployed toward the vehicle occupant.

Further, referring to FIG. 5, the airbag cushion 300 of the roof airbag 10 for a vehicle related to an embodiment may include a plurality of guide sections 302.

The plurality of guide sections 302 can guide a flow of the inflation gas when the inflation gas flows into the interior of the airbag cushion 300. The flow of the inflation gas is controlled by the guide sections 302, a manner in which the airbag cushion 300 is deployed or an overall shape of the airbag cushion 300 can be controlled. The guide sections 302 may be seam lines formed at the airbag cushion 300 or a predetermined pattern formed outside the airbag cushion 300.

The plurality of guide sections 302 may have a shape extending in a width direction D2 of the airbag cushion 300. Lengths of the guide sections 302 may be smaller than a width of the airbag cushion 300. Further, the plurality of guide sections 302 may be disposed to be spaced at a predetermined interval in a length direction D3 of the airbag cushion 300. The length direction D3 may be a direction in which the airbag cushion 300 is inflated when deployed.

The guide sections 302 can control a shape of the airbag cushion 300 according to a body shape of the vehicle occupant coming into contact with the airbag cushion 300. Since the guide sections 302 extend in the width direction D2 of the airbag cushion 300, the body of the vehicle occupant can come into contact with the airbag cushion 300 toward the center at opposite ends of the guide sections 302 due to the collision. Since a contracting force in the width direction D2 acts on the airbag cushion 300, the airbag cushion 300 can be contracted in the width direction D2. When the airbag cushion 300 is contracted in the width direction D2, the guide sections 302 can also be contracted in the width direction. In this case, the guide sections 302 are contracted to correspond to a body structure of the vehicle occupant who touches the airbag cushion 300, the shape of the airbag cushion 300 can correspond to the body shape of the vehicle occupant. Therefore, since the airbag cushion 300 is controlled in a shape suitable for the body structure of the vehicle occupant, it is possible effectively absorb impacts.

The roof airbag 10 for the vehicle related to an embodiment may include an airflow path A that is a path along which the inflation gas flows inside the airbag cushion 300. The inflation gas flows along the airflow path A, and the airbag cushion 300 can be deployed by the inflation gas flowing along the airflow path A.

The inflation gas flows along the airflow path A, and thereby the airbag cushion 300 is deployed. For this reason, the airflow path A can determine a way in which the airbag cushion 300 is deployed. That is, by controlling the airflow path A, the deployment operation of the airbag cushion 300 can be determined.

The airflow path A may include a first airflow path A1 along which the inflation gas flows to outskirts of the airbag cushion 300 when the inflation gas is discharged, and a second airflow path A2 which branches off from the first airflow path A1 and along which the inflation gas flows to the center portion of the airbag cushion 300. The first airflow path A1 may correspond to a shape of the outskirt edge of the airbag cushion 300.

The airflow path A may be formed by the guide sections 302. In other words, the flow of the inflation gas is guided in the interior of the airbag cushion 300 by the guide sections 302, thereby the airflow path A can be formed. When the plurality of guide sections 302 are separated and disposed at a predetermined interval in the length direction D3 of the airbag cushion 300, a first airflow path A1 along which the inflation gas supplied to the interior of the airbag cushion 300 flows along the outer sides of the guide sections 302, and a second airflow path A2 along which the inflation gas flows between the plurality of guide sections 302 on the first airflow path A1 may be formed.

When the inflator 200 is operated, the inflation gas can flow along the first airflow path A1 and the second airflow path A2. First, the inflation gas flows the first airflow path A1, and thereby the outskirts of the airbag cushion 300 can be deployed. The inflation gas flows to the second airflow path A2, and thereby the airbag cushion 300 can be deployed to a size sufficient to protect the vehicle occupant.

Thus, when a collision accident occurs, the roof airbag 10 for the vehicle is configured such that the inflation gas flows along the outskirt of the airbag cushion 300 first, the airbag cushion 300 can be rapidly deployed toward the vehicle occupant. The outskirt shape of the airbag cushion 300 is formed, and simultaneously the inflation gas flows to the center portion of the airbag cushion 300, and thereby the airbag cushion 300 can be formed at a thickness sufficient to protect the vehicle occupant.

Those having ordinary knowledge in the art field related to the present embodiments will understand that the present disclosure can be implemented without departing from the essential features of the above-mentioned description. Therefore, disclosed methods should be considered from the descriptive viewpoint rather than the limited viewpoint. The scope of the present disclosure is defined by the following claims rather than by the detailed description of the illustrative embodiment, and all the differences within the scope equivalent thereto should be interpreted as being included in the present disclosure.

What is claimed is:

1. A roof airbag disposed at a roof of a vehicle and configured to deploy into an interior space of the vehicle, the roof airbag comprising:
    a bracket disposed at the roof;
    one or more inflators connected to the bracket and configured to discharge an inflation gas;
    an airbag cover connected to the bracket;
    an airbag cushion folded in the airbag cover and configured to deploy into an interior space of the vehicle when supplied with the inflation gas discharged from the inflator;
    one or more tethers, each having a first end coupled to the roof and a second end coupled to the airbag cushion, and configured to support the airbag cushion such that the airbag cushion is deployed toward a seat of the vehicle; and
    a fastening member disposed on the roof and extending through the bracket and the airbag cover,
    wherein the airbag cushion has first and second chambers respectively disposed on first and second sides of the vehicle with respect to the fastening member.

2. The roof airbag for the vehicle of claim 1, wherein:
    the first chamber is configured to deploy toward the first side of the vehicle in a vehicle width direction, and
    the second chamber is configured to deploy toward the second side of the vehicle in the vehicle width direction.

3. The roof airbag for the vehicle of claim 2, wherein the tether includes:
    a first tether having (1) the first end coupled to a first portion of the roof positioned at the first side of the vehicle and (2) the second end coupled to the first chamber; and
    a second tether having (1) the first end of coupled to a second portion of the roof positioned at the second side of the vehicle and (2) the second end coupled to the second chamber.

4. The roof airbag for the vehicle of claim 2, wherein the inflator includes a first inflator connected to the first chamber and a second inflator connected to the second chamber.

5. The roof airbag for the vehicle of claim 4, wherein the first and second inflators are configured to operate independently of each other.

6. The roof airbag for the vehicle of claim 1, wherein a length of the tether is less than or equal to that of the airbag cushion.

7. The roof airbag for the vehicle of claim 1, wherein the airbag cushion includes a plurality of guide sections configured to guide a flow of the inflation gas.

8. The roof airbag for the vehicle of claim 7, wherein the plurality of guide sections extend in a widthwise direction of the airbag cushion and are configured to be separated from each other at a predetermined interval in a lengthwise direction of the airbag cushion.

9. The roof airbag for the vehicle of claim 1, wherein the bracket is disposed on a cross panel of the roof.

10. A roof airbag disposed at a roof of a vehicle and configured to deploy into an interior space of the vehicle, the roof airbag comprising:

a bracket disposed at the roof;

one or more inflators connected to the bracket and configured to discharge an inflation gas;

an airbag cover connected to the bracket;

an airbag cushion folded in the airbag cover and configured to deploy into an interior space of the vehicle when supplied with the inflation gas discharged from the inflator;

one or more tethers, each having a first end coupled to the roof and a second end coupled to the airbag cushion, and configured to support the airbag cushion such that the airbag cushion is deployed toward a seat of the vehicle; and an airflow path along which the inflation gas flows when the inflation gas is supplied by the inflator to an interior of the airbag cushion, wherein the airflow path includes:

a first airflow path along which the inflation gas flows to outskirts of the airbag cushion when the inflation gas is discharged from the inflator; and a second airflow path branched off from the first airflow path, wherein the inflation gas flows along the second airflow path to a central portion of the airbag cushion, wherein the first airflow path has a shape corresponding to that of an edge of the outskirts of the airbag cushion.

11. The roof airbag for the vehicle of claim 10, wherein:

the airbag cushion includes a plurality of guide sections extending in a widthwise direction of the airbag cushion and spaced apart from each other with a predetermined interval in a lengthwise direction of the airbag cushion, and the first airflow path is positioned outside of the plurality of guide sections, and the second airflow path is positioned between the plurality of guide sections.

* * * * *